United States Patent
Schabel et al.

[19]

[11] Patent Number: 6,056,126
[45] Date of Patent: May 2, 2000

[54] SCREEN DEVICE WITH SLOT-SHAPED OPENINGS

[75] Inventors: Samuel Schabel, Ravensburg; Peter Schweiss, Elchingen, both of Germany

[73] Assignee: Voith Sulzer Papiertechnik Patent GmbH, Ravensburg, Germany

[21] Appl. No.: 08/989,025

[22] Filed: Dec. 11, 1997

[30] Foreign Application Priority Data

Dec. 12, 1996 [DE] Germany ............ 196 51 643

[51] Int. Cl.⁷ .................................. B07B 1/49
[52] U.S. Cl. ............... 209/406; 209/393; 209/395
[58] Field of Search .................. 209/393, 395, 209/406, 407, 408, 409, 410, 411

[56] References Cited

U.S. PATENT DOCUMENTS

| | | |
|---|---|---|
| 5,011,065 | 4/1991 | Musselmann . |
| 5,047,148 | 9/1991 | Arai . |
| 5,090,721 | 2/1992 | Lange . |
| 5,094,360 | 3/1992 | Lange . |
| 5,586,662 | 12/1996 | Aikawa ................ 209/411 |
| 5,605,234 | 2/1997 | Aikawa . |
| 5,791,495 | 8/1998 | Gero et al. ............. 209/395 |
| 5,823,355 | 10/1998 | Abdulmassih et al. ........ 209/406 |

FOREIGN PATENT DOCUMENTS

| | | |
|---|---|---|
| 0316570 | 5/1989 | European Pat. Off. . |
| 0499154 | 8/1992 | European Pat. Off. . |
| 0719890 | 7/1996 | European Pat. Off. . |
| 0724037 | 7/1996 | European Pat. Off. . |
| 0705936 | 4/1999 | European Pat. Off. . |
| 1917310 | 11/1970 | Germany . |
| 2144264 | 3/1972 | Germany . |
| 8134625 | 1/1983 | Germany . |
| 3307677 | 9/1984 | Germany . |
| 3927748 | 3/1994 | Germany . |
| 4214061 | 2/1995 | Germany . |
| 9630587 | 10/1996 | WIPO . |

*Primary Examiner*—Donald P. Walsh
*Assistant Examiner*—Brett C. Martin
*Attorney, Agent, or Firm*—Greenblum & Bernstein, P.L.C.

[57] ABSTRACT

A screen device including a multitude of parallel rods between which are located the sorting slots. The rods are held in position by supporting elements, which are connected with carriers. The respective cover elements are located at the faces of the rods. Due to their special design, the cover elements may be detachable. The screen devices may be used, for example, in the paper-making industry as cylindrical screen baskets or plane screens.

33 Claims, 3 Drawing Sheets ns with a multitude of substantially parallel aligned rods. Between the parallel rods are sorting slots or sorting slits which are fixed in the supporting elements and cover elements.

SCREEN DEVICE WITH SLOT-SHAPED OPENINGS

CROSS-REFERENCE TO RELATED APPLICATION

The present application claims priority under 35 U.S.C. § 119 of German Patent Application No. 196 51 643.9 filed Dec. 12, 1996, the disclosure of which is expressly incorporated by reference herein in its entirety.

BACKGROUND OF THE INVENTION

1. Field of the Invention

The present invention relates to a screen device for sorting fiber suspensions with a multitude of substantially parallel aligned rods. Between the parallel rods are sorting slots or sorting slits which are fixed in the supporting elements and cover elements.

2. Discussion of Background Information

It is known to use this type of device for sorting fiber suspensions. The fibers contained in the suspension are to pass through the screen, while undesired solid components are rejected at the slot (or slit) and removed from the screen device. Another conceivable use for the device is the separation of varying fiber components. Due to the fact that the openings are substantially longitudinal in shape, i.e., slots or slits, the fibrous particles pass through these slots more easily than cubic particles, even if both particles have a similar order of magnitude. This type of sorting technology, therefore, has an excellent capability of removing non-fibrous interfering substances from the fiber suspension. This, however, requires dimensional stability and a high precision of the slot shape on the entire screen surface.

In many cases, such screen devices are subject to severe wear and thus need replacing.

A method for producing rod wire or screen or sieve baskets is shown in DE 39 27 748 A1, wherein the sectional rods are clamped by an elastic deformation of the supporting rings that include recesses for holding the rods. Sectional rods, which are particularly suitable for this type of production method, are used. This method allowed one to considerably reduce the production costs, however, when using this type of screen basket, certain restrictions could not be ruled out, especially when subjected to intensive mechanical loads.

Screens or screen elements with good stability and excellent surface quality may also be produced according to a method described in DE 42 14 061 A1. There, the rod-shaped profiles are fixed by using a high-temperature soldering method. The result is excellent, but the process is burdensome and expensive.

EP 0 724 037 A2 describes slot-shaped screen or sieve baskets that are designed with sortings slots formed between parallel rods. The rods pass through supporting rings which hold the rods at the required lateral distance. The supporting rings are connected by spacers, which ensure that the shape of the screen basket is maintained, even if the rods that define the sorting slot are removed. This type of design, however, does not produce adequate stability in all cases.

EP 0 719 890 A2 describes another rod wire or screen device. There, the rods are designed to increase in thickness so that they maintain the distance necessary for forming the slot. Even if the wires produced by this method offer the advantage of easy dismantling, the production of these rods is relatively costly. Further, it is difficult to guarantee adequate stability with this type of wire.

SUMMARY OF THE INVENTION

The object of the present invention is to achieve a screen device with optimal stability that is easy to produce.

This object is achieved by a device including slot-shaped openings for sorting fiber suspensions. The device further includes parallel aligned rods, forming the sorting slots or slits. The rods are fixed in the supporting elements and cover elements. The supporting elements include recesses to accommodate, at least partially, the rods, and to connect several or all of the rods contained in the screen device.

The inventive design of the present screen device is advantageous because the rods forming the wire slot, and the supporting elements that support the rods, are subjected to much less mechanical stress than in the prior art. As explained above, depending on the application, considerable forces, even pulsations, may occur with this type of screen, that severely stress the entire device and eventually may cause its destruction. In the immediate vicinity of the slot, moreover, there should be as few components as possible, because the components interfere with the flow during operation. Due to the inventive design of the present invention, the aforementioned forces are only negligibly absorbed by the rods or the supporting elements. Rather, the forces are largely transferred to the carriers. The carriers may be correspondingly solid, that is to say, resistant to bending. Further, in special designs, the longitudinal direction of the carriers may have a varying stiffness or thickness depending, for example, on the transverse beam calculation. If desired, the rods may be held securely in the supporting elements, completely without undetachable connections. This is significant, in particular, if vibrations create a risk that cracks may form, e.g., on weld seams or the like.

If the screen devices are produced by a method such as, for example, the one described in DE 39 27 748 A1, in which the rods are clamped into the supporting elements by slightly distorting or deforming the supporting elements. Moreover, using relatively narrow supporting elements offers the advantage of making it considerably easier to perform the deformation or distortion.

In a further inventive improvement, it is possible to detachably connect at least one of the cover elements with the carriers. The cover element may be detached or removed for repair purposes. If the seat of the rods in the supporting elements is designed correspondingly, the rods may be removed for dismantling, e.g., in the longitudinal direction. Clearly, this design makes it very easy not only to dismantle, but also to produce special screen (or sieve) baskets, because the rods can be inserted. The cover elements then prevent the rods from sliding in the axial direction. This enables slight prestressing of the rods in the supporting elements, to protect the rods against vibrations in the recesses. Such a prestressing may be performed by a thermal shrink fitting.

Fixing the rods in the supporting elements can also be improved upon as follows. While assembling the screen or sieve device, the cover elements may be connected with the carriers such that the recesses are displaced in the direction of the circumference relative to the recesses of the supporting elements. As a result, a torsioned strain would be transferred onto the rods, which would improve the fixing or setting of said rods.

The above-described designs, which considerably facilitate the assembly and disassembly of individual rods, do not necessarily have to be realized in the development of the present invention. The advantages which were described initially, and which relate to increasing the stability of the screen device, may be enhanced in other cases, for example, where the rods in the supporting elements are more or less permanent or undetachable, due to soldering, high-temperature soldering, adhesion, or the like.

Another way to state the invention is a screen device for sorting fiber suspensions that includes substantially parallel aligned rods that have a longitudinal axis. The device further includes supporting elements that include recesses to receive at least part of at least a plurality of the rods. The device further includes sorting slots, defined by the rods, and cover elements. The rods are coupled with the supporting elements and with the cover elements. The supporting elements, moreover, are coupled to the carriers on a side opposite a side the supporting elements are coupled to the rods. The carriers include faces, which are coupled to the cover elements.

According to another aspect of the invention, the carriers are more rigid than the supporting elements.

According to another aspect of the invention, at least one of the supporting elements is permanently affixed to the carriers. Further, it is possible for at least one of the cover elements to be detachably connected to the carriers. In fact, at least one of the cover elements may be bolted onto the carriers.

According to yet another aspect of the invention, at least one of the cover elements may lock the rods against longitudinal movement. Further, it is possible that at least one cover element may include recesses to receive at least part of the rods.

According to still yet another aspect of the invention, at least one cover element may brace the rods.

According to another aspect of the invention, the device may further include at least one spring element that is positioned between at least one of the rods and at least one of the cover elements. Further, it is possible for the spring element to be composed of a seal.

According to another aspect of the invention, at least one cover element may includes recesses and the cover element may be positioned to circumferentially displace the cover element recesses relative to the supporting element recesses. Thus, the rods are deformably positioned within the cover element recesses.

According to another aspect of the invention, the rods may be impermanently attached such that the rods are immovable during use of the screen device.

According to another aspect of the invention, the rods may be removable, in the direction of the longitudinal axis of the rods, from the supporting elements, after at least one cover element is removed.

It is possible for the rods being permanently affixed to the supporting elements.

According to another aspect of the invention, the recesses in the supporting elements may be beveled towards the inside and expand further deeper inside.

Further, it is possible for the sorting slots to be further defined by the supporting elements.

According to yet another aspect of the invention, the rods may be composed such that they increase in thickness where the rods are received by the supporting elements. Further, the rods may have a cross section that is shaped like a triangle with rounded-off edges at the point where the rods are received by the supporting element.

According to another aspect of the invention, the rods may be formed of a drawn profile.

Further, according to another aspect of the invention, the supporting elements and the cover elements may be ring-shaped, wherein the screen device is a cylindrical screen basket.

It is possible, moreover, for the supporting elements and the cover elements to be annular segments, so that the screen device is a curved screen or so that the screen device is a semi-circular screen basket.

According to another aspect of the invention, it is possible to have a screen device that is not circular or curved. Rather, the rods may be arranged in a substantially flat plane.

Further, it is possible to have the supporting elements to be positioned perpendicular, or substantially perpendicular, to the rods and be coupled with the rods in that manner.

According to yet another aspect of the invention, the carriers may be arranged such that the carriers are in plane that is substantially parallel to the plane in which the rods are arranged. In this case, the screen extends in a substantially linear direction, i.e, is flat or planar.

Another way to explain the invention is as a screen device for sorting fiber suspensions that includes rods including top faces and bottom faces. The rods have a longitudinal axis and are positioned substantially parallel to the longitudinal axis to form slits. The device further includes support elements, having a rod receiving side that includes recesses, a top cover element covering the top faces of the rods and a bottom cover element to cover the bottom faces of the rods. The device further includes carriers associated with the top cover element and the bottom cover element. The support elements are connected to the carriers on a side opposite the rod receiving side.

According to another aspect of the invention, the top cover element may be impermanently attached to the top faces of the rods. Further, the top cover element may be impermanently attached to the top faces of the rods, and the bottom cover element may be impermanently attached to the bottom faces of the rods.

According to another aspect of the invention the rods may be positioned on the outer side of the support elements. Further, the rods may be positioned on the inner side of the support elements.

According to another aspect of the invention, the bottom cover may be permanently attached to the bottom faces of the rods.

According to another aspect of the invention, the device may further include at least one spring element adjacent the top faces of the rods and adjacent the top cover element. Further, at least one spring element may be adjacent the bottom faces of the rods and adjacent the bottom cover element.

It is possible for the carriers to be composed of a steel profile with a substantially rectangular cross section.

Other exemplary embodiments and advantages of the present invention may be ascertained by reviewing the present disclosure and the accompanying drawing.

BRIEF DESCRIPTION OF THE DRAWINGS

The present invention may be further described in the detailed description which follows, in reference to the noted drawing by way of non-limiting example of a preferred embodiment of the present invention, and wherein.

DETAILED DESCRIPTION OF THE PRESENT INVENTION

Figure 1:
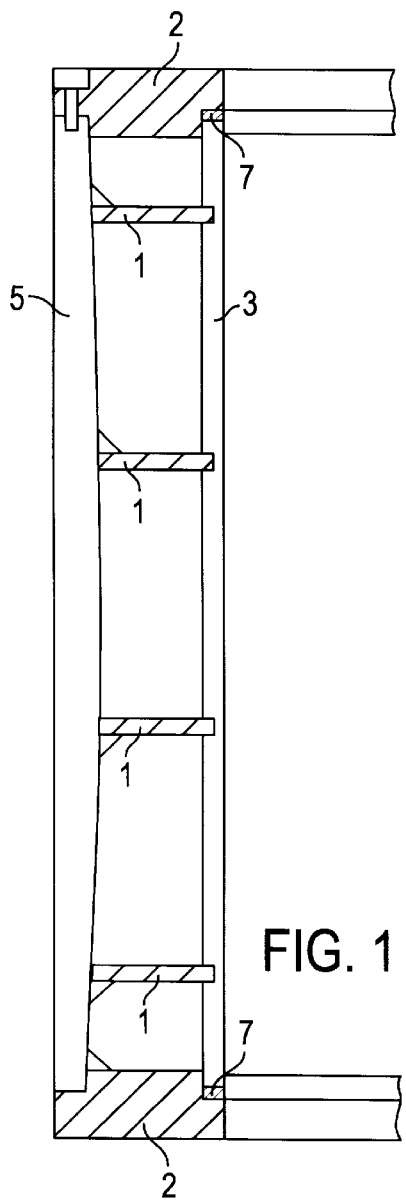
FIG. 1 is a schematic cross-sectional side view of inventive screen or sieve device.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing figures making apparent to those skilled in the art how the invention may be embodied in practice.

FIG. 1 is a cross-section view of a screen or sieve device. It shows one of the parallel aligned rods 3 held by a multitude of supporting elements 1. According to the invention, the supporting elements 1 are connected to the carriers 5 on the side of the supporting elements 1 that is opposite the rods 3, (i.e., in FIG. 1, on the left-hand side). The carriers 5, in turn, are connected to the cover elements 2. Here, the carrier 5 is composed of a steel profile with a rectangular cross section that is not equal in length (i.e., transverse beam calculation), so that the carrier 5 better absorbs the bending forces across the length of the carrier 5. In the region of the face, the carrier is connected on both sides with the cover elements 2. This connection may be performed both on the face and in the area near the face. In the example shown in FIG. 1, the lower cover element 2 is more or less permanently connected (for example, by welding) with the carriers 5 so that it is undetachable. On the other hand, the upper cover element 2 can be removed if required, because this element is screwed onto the carriers 5. As previously discussed, this enables the screen device to be easily dismantled, as for example, removing the rods 3 in the longitudinal direction. The screen device shown in this example is substantially cylindrical. For this reason, the cover elements 2 and the supporting elements 1 are substantially annular. To present a clearer picture, FIG. 1 shows only rod 3, and the supporting elements are merely sketched, i.e., their annular shape is not shown.

Figure 2:
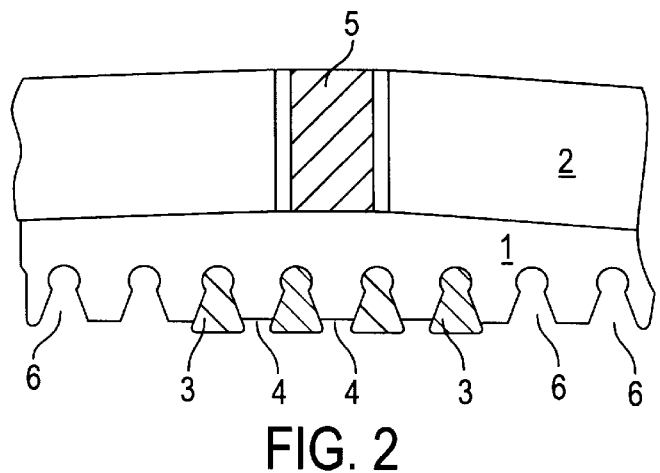
FIG. 2 is a schematic cross-sectional top view of a part of the screen device.

FIG. 2 is a cross-sectional top view of the screen device. The drawing shows four rods 3 with recesses 6 in the supporting elements 1. In this drawing, four rods 3 are visible, and in other places the recesses 6 are shown. The recesses 6 are incorporated in the supporting elements 1. The supporting element 1 rests against the carrier 5 which, in turn, is connected with the subjacent cover element 2. Further, FIG. 2 indicates a weld seam between the carrier 5 and the cover element 2.

Figure 5:
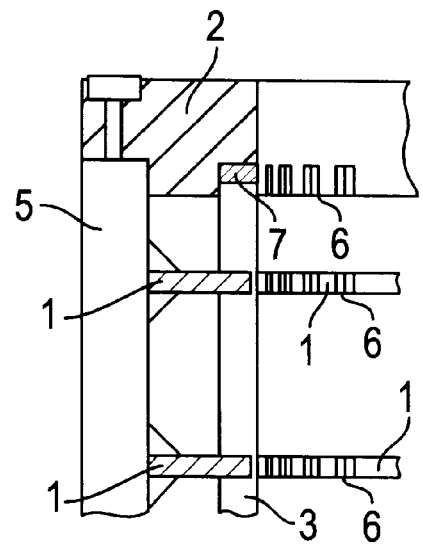

The cover elements 2 (in FIG. 1) may transmit an axial force to the rods 3 through the spring elements 7 that are respectively located at the face of the rods 3. The spring elements 7 may either be circular sealing rings or, as is indicated in FIG. 5, if the cover elements 2 includes recesses 6' for a precision-fit accommodation of three rods 3, the inserted spring elements 7 will have a corresponding shape. In such cases, the cover element 2, for all practical purposes, is closely connected to the carriers 5. Further, the spring elements 7 are advantageous in that they act as a seal.

Figure 3:
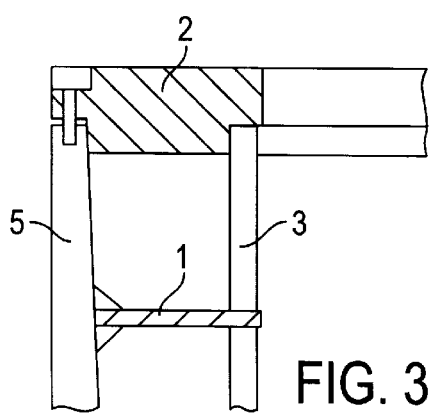
FIGS. 3 through 5 show respective variants in detail.
Figure 4:
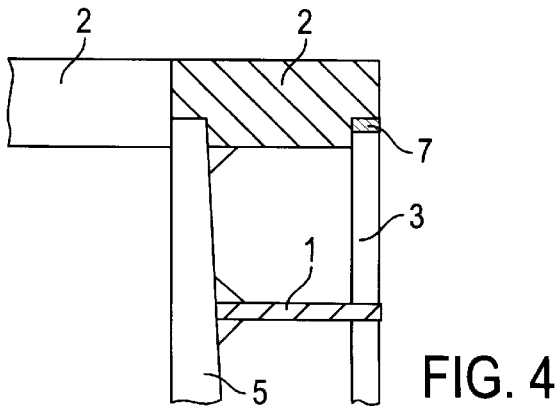

FIG. 3 shows a different method of attachment, wherein the cover element 2 is placed directly on the rods 3, and the screw connection between the cover element 2 and the carrier 5 is composed of a clamping connection with the slot. This enables an adjustable fixing force to be provided.

Where it is not required to dismantle the rods 3, both cover elements 2 can be more or less permanently connected with the carriers 5, so that they are undetachable. For example, the cover elements 2 and the carriers 5 may be welded, as shown in FIG. 4. FIG. 4 also shows the possibility of placing the carriers 5 radially towards the inside. This is appropriate if the rakers for the screen device move outward, i.e., radially beyond the rods 3. For practical purposes, in the other examples shown here, the rakers move inside.

FIGS. 3 and 4 show another variation wherein the rods 3 are pushed through the supporting elements 1. Thus, the rods 3 may be removed only in the longitudinal direction. In FIG. 1, the rods 3 are only partially enclosed by the supporting elements 1.

In FIG. 2, the rods are shown with a special profile. This profile is particularly advantageous for fixing or assembling the rods 3 in the supporting elements 1 because the supporting elements 1 are flexible, so that the deformation or distortion of the supporting elements 1 allows the rods 3 to be assembled or fixed.

While in many cases it is appropriate to provide the carriers with an uneven cross section, another design can be provided. As shown in FIG. 5, the carriers have a substantially constant carrier profile. Of course, the profile does not necessarily have to be rectangular.

Figure 6:
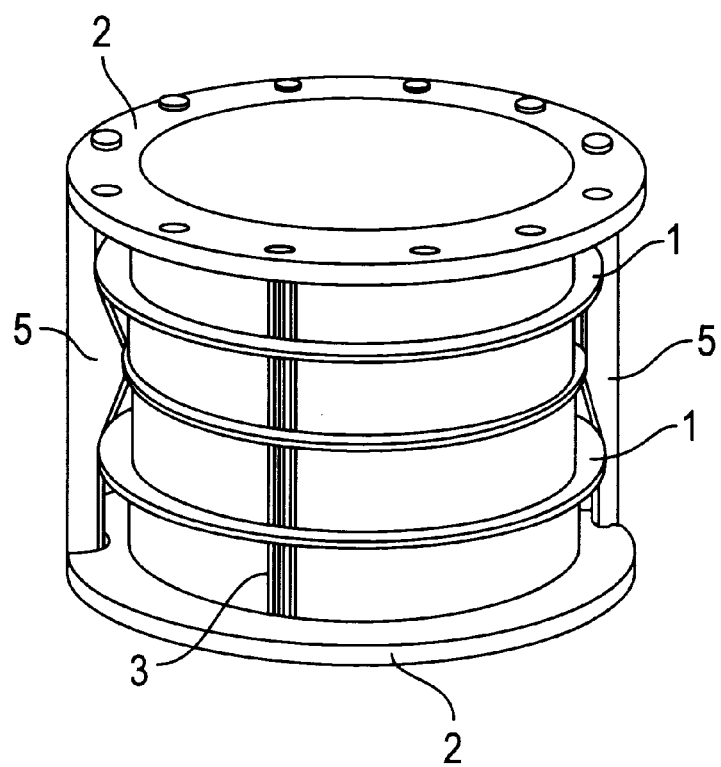
FIG. 6 is a diagram of an inventive screen device, showing a perspective overall view.

FIG. 6 shows a perspective view of the complete screen or sieve device according to the invention, in which some of the carriers 5, in this case, three (only two of which are shown), support the supporting elements and are fixed in the cover elements 2. Screw connections are indicated on the upper cover element 2. As is known, this type of screen device includes a large number of rods 3, of which only a few are shown.

Figure 7:
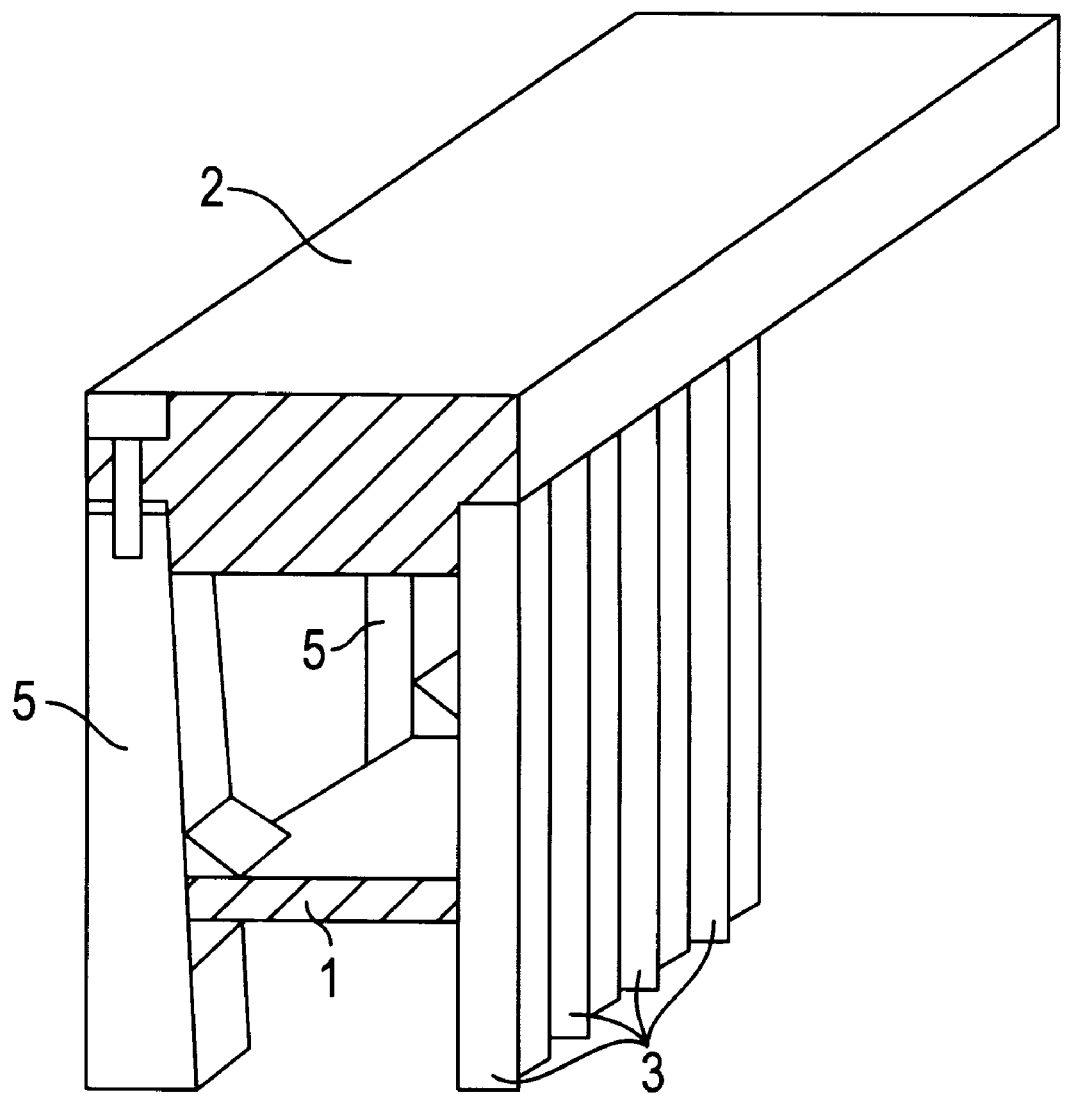
FIG. 7 is a diagram of another embodiment of the screen device.

FIG. 7 depicts another possible embodiment of the present invention. In FIG. 7, the rods 3 are presented in a substantially flat plane, that is, the rods do not form a semi-circle or cylindrical basket. Rather, the rods 3 are assembled to form a substantially flat screen device. As shown in FIG. 7, when the rods 3 are assembled in this manner, the carriers 5 may also be formed in a substantially flat plane. In fact, the plane in which the carriers 5 are formed may be substantially parallel to the plane in which the rods are assembled. The supporting elements 1 are coupled with the rods 3 and the carriers 5.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and the spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A screen device for sorting fiber suspensions comprising:

substantially parallel aligned rods having a longitudinal axis;

supporting elements including recesses to receive at least part of at least a plurality of the rods;

sorting slots being defined by the rods;

cover elements;

the rods being coupled with the supporting elements and with the cover elements;

carriers associated with the cover elements:

the supporting elements being coupled to the carriers on a side opposite a side on which the supporting elements are coupled to the rods; and the carriers including faces, the faces being coupled to the cover elements.

2. The screen device according to claim 1, the carriers being more rigid than the supporting elements.

3. The screen device according to claim 1, at least one of the supporting elements being permanently affixed to the carriers.

4. The screen device according to claim 1, the at least one of the cover elements being detachably connected to the carriers.

5. The screen device according to claim 4, the at least one of the cover elements being bolted onto the carriers.

6. The screen device according to claim 5, the at least one of the cover elements locking the rods against longitudinal movement.

7. The screen device according to claim 6, the at least one cover element including recesses to receive at least part of the rods.

8. The screen device according to claim 7, the at least one cover element bracing the rods.

9. The screen device according to claim 8, further comprising at least one spring element positioned between at least one of the rods and at least one of the cover elements.

10. The screen device according to claim 9, the spring element being composed of a seal.

11. The screen device according to claim 10, the at least one cover element includes recesses, the cover element positioned to circumferentially displace the cover element recesses relative to the supporting element recesses, the rods deformably positioned within the cover element recesses.

12. The screen device according to claim 11, the rods being impermanently attached such that the rods are immovable during use of the screen device.

13. The screen device according to claim 12, the rods being removable in the direction of the longitudinal axis of the rods from the supporting elements after removing the at least one cover element.

14. The screen device according to claim 1, the rods being permanently affixed to the supporting elements.

15. The screen device according to claim 1, the recesses in the supporting elements being beveled towards the inside and expanding further deeper inside.

16. The screen device according to claim 1, the sorting slots being further defined by the supporting elements.

17. The screen device according to claim 1, the rods being composed to increase in thickness where the rods are received by the supporting element, the rods having a cross section shaped like a triangle with rounded-off edges where the rods are received by the supporting element.

18. The screen device according to claim 1, the rods being formed of a drawn profile.

19. The screen device according to claim 1, the supporting elements and the cover elements being ring-shaped, wherein the screen device is a cylindrical screen basket.

20. The screen device according to claim 1, the supporting elements and the cover elements being annular segments, so that the screen device is a curved screen.

21. The screen device according to claim 1, the supporting elements and the cover elements being annular segments, so that the screen device is a semi-circular screen basket.

22. The screen device according to claim 1, the rods being arranged in a substantially flat plane.

23. The screen device according to claim 22, the supporting elements being substantially perpendicularly coupled with the rods.

24. The screen device according to claim 22, the carriers being arranged in a plane that is substantially parallel to the plane in which the rods are arranged, the screen extending in a substantially linear direction.

25. A screen device for sorting fiber suspensions comprising:

rods including top faces and bottom faces, the rods having a longitudinal axis and positioned substantially parallel to the longitudinal axis to form slits;

support elements having a rod receiving side that includes recesses;

a top cover element covering the top faces of the rods;

a bottom cover element to cover the bottom faces of the rods;

carriers associated with the top cover element and the bottom cover element, and the support elements being connected to the carriers on a side opposite the rod receiving side.

26. The screen device according to claim 25, the top cover element being impermanently attached to the top faces of the rods.

27. The screen device according to claim 25, the top cover element being impermanently attached to the top faces of the rods, and the bottom cover element being impermanently attached to the bottom faces of the rods.

28. The screen device according to claim 25, the rods being positioned on the outer side of the support elements.

29. The screen device according to claim 25, the rods being positioned on the inner side of the support elements.

30. The screen device according to claim 25, the bottom cover being permanently attached to the bottom faces of the rods.

31. The screen device according to claim 25, further comprising at least one spring element adjacent the top faces of the rods and adjacent the top cover element.

32. The screen device according to claim 25, further comprising at least one spring element adjacent the bottom faces of the rods and adjacent the bottom cover element.

33. The screen device according to claim 25, the carriers being composed of a steel profile with a substantially rectangular cross section.

* * * * *